(12) United States Patent
Rankin et al.

(10) Patent No.: US 11,435,157 B1
(45) Date of Patent: Sep. 6, 2022

(54) CARGO STRAP GUN ASSEMBLY

(71) Applicants: Jesse Rankin, Quincy, IL (US); Henry Bowen, Jr., Quincy, IL (US)

(72) Inventors: Jesse Rankin, Quincy, IL (US); Henry Bowen, Jr., Quincy, IL (US)

( * ) Notice: Subject to any disclaimer, the term of this patent is extended or adjusted under 35 U.S.C. 154(b) by 0 days.

(21) Appl. No.: 17/203,851

(22) Filed: Mar. 17, 2021

(51) Int. Cl.
*B60P 7/00* (2006.01)
*F41B 7/00* (2006.01)
*B60P 7/08* (2006.01)

(52) U.S. Cl.
CPC .............. *F41B 7/00* (2013.01); *B60P 7/0853* (2013.01); *B60P 7/0823* (2013.01)

(58) Field of Classification Search
CPC ..... B60P 7/0853; B60P 7/0823; B60P 7/0846; B60P 7/06; F41B 7/00; F41B 7/04; F41B 7/08; A63H 33/18
See application file for complete search history.

(56) References Cited

U.S. PATENT DOCUMENTS

| | | | |
|---|---|---|---|
| 335,104 A * | 2/1886 | Lakin | F41B 7/00 124/26 |
| 2,837,078 A * | 6/1958 | Daniel | F41B 7/04 124/48 |
| 4,077,349 A | 3/1978 | Paul | |
| 4,165,729 A * | 8/1979 | Niemirow | F41B 7/00 124/31 |
| 4,335,701 A * | 6/1982 | Bozich | F41B 7/00 124/83 |
| 6,681,676 B2 | 1/2004 | Hayes | |
| 7,393,031 B2 | 7/2008 | Goulet | |
| 9,016,267 B1 | 4/2015 | Tseng | |
| 9,227,552 B2 | 1/2016 | McCullough | |
| 9,546,855 B2 | 1/2017 | Highham | |
| 10,182,554 B1 * | 1/2019 | Santiago | A63B 69/407 |
| 10,406,965 B1 | 9/2019 | Johnson | |
| 2002/0053278 A1 * | 5/2002 | Hayes | F42B 12/68 89/1.34 |
| 2003/0069091 A1 * | 4/2003 | Wengert | F41B 11/681 124/69 |
| 2008/0178440 A1 | 7/2008 | Douglas | |
| 2009/0071456 A1 * | 3/2009 | Chia | F41B 7/08 124/16 |
| 2013/0206895 A1 * | 8/2013 | Van Benthem | B65H 54/585 242/532.6 |
| 2016/0016095 A1 * | 1/2016 | Aguila | A63H 37/00 124/16 |
| 2016/0187097 A1 * | 6/2016 | Jaber | F41B 7/04 124/83 |
| 2017/0115091 A1 * | 4/2017 | Henson | F41B 7/08 |
| 2021/0259205 A1 * | 8/2021 | Cmajdalka | F41B 7/00 |

FOREIGN PATENT DOCUMENTS

CA 2885757 3/2015

* cited by examiner

*Primary Examiner* — John E Simms, Jr.

(57) ABSTRACT

A cargo strap gun assembly includes a cylinder that has an open end and a closed end. The cylinder is substantially hollow and the open end can receive a cargo strap. A plunger is slidably positioned in the cylinder and the plunger is compressible into a loaded position. The plunger is biased into a fired position to launch the cargo strap outwardly from the cylinder thereby facilitating the cargo strap to be launched over a load. A cocking mechanism is slidably integrated into the cylinder to urge the plunger into the loaded position. A trigger is movably integrated into the cylinder to facilitate the plunger to be biased into the fired position.

6 Claims, 5 Drawing Sheets

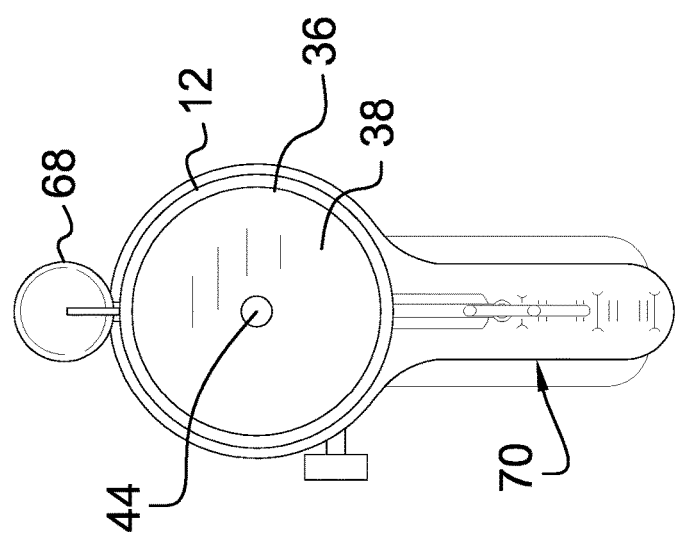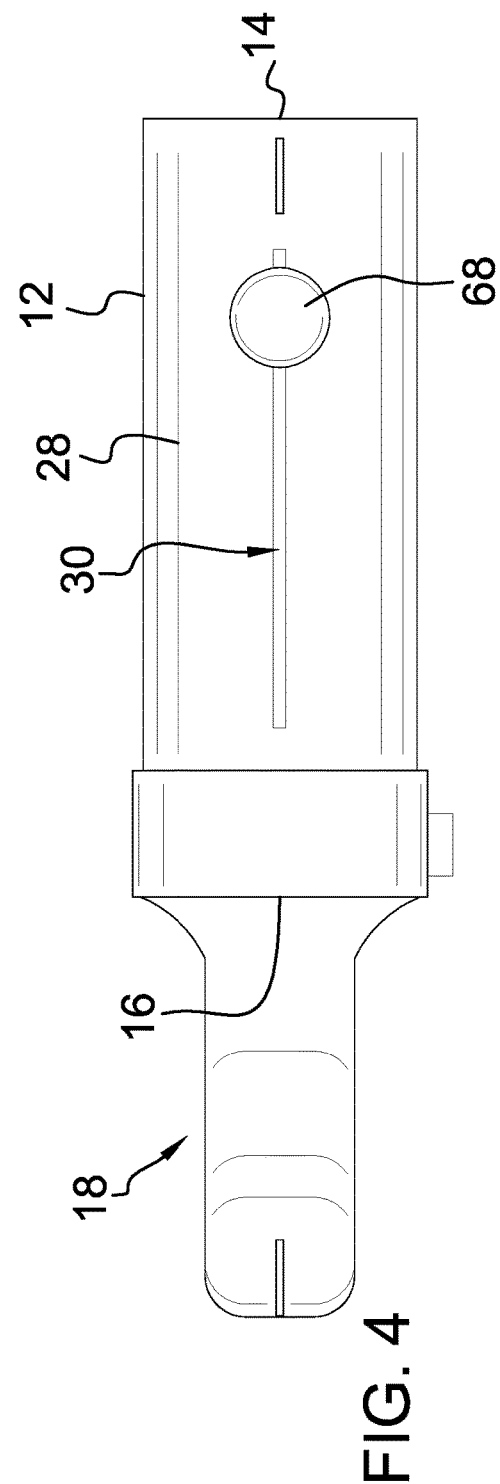
FIG. 3
FIG. 4

CARGO STRAP GUN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gun devices and more particularly pertains to a new gun device for launching a cargo strap over a load. The device includes a spring loaded plunger that is positioned in a cylinder and a trigger that engages the plunger. A cargo strap can be loaded into the cylinder and the plunger launches the cargo strap when the trigger is manipulated. In this way the cargo strap can be launched over the load to facilitate the cargo strap to be tightened over the load for securing the load.

(2) Description of Related Art Including Information Disclosed Under 37 CFR 1.97 and 1.98

The prior art relates to gun devices including a variety of launching devices that comprise a gun for launching a line over an object. The prior art discloses a variety of launching devices for launching a cargo strap over a load by means of a manually operated catapult device. In no instance does the prior art disclose a gun which includes a spring loaded plunger for launching a cargo strap over a load.

BRIEF SUMMARY OF THE INVENTION

An embodiment of the disclosure meets the needs presented above by generally comprising a cylinder that has an open end and a closed end. The cylinder is substantially hollow and the open end can receive a cargo strap. A plunger is slidably positioned in the cylinder and the plunger is compressible into a loaded position. The plunger is biased into a fired position to launch the cargo strap outwardly from the cylinder thereby facilitating the cargo strap to be launched over a load. A cocking mechanism is slidably integrated into the cylinder to urge the plunger into the loaded position. A trigger is movably integrated into the cylinder to facilitate the plunger to be biased into the fired position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a top view of an embodiment of the disclosure.

DETAILED DESCRIPTION OF THE INVENTION

Figure 1:
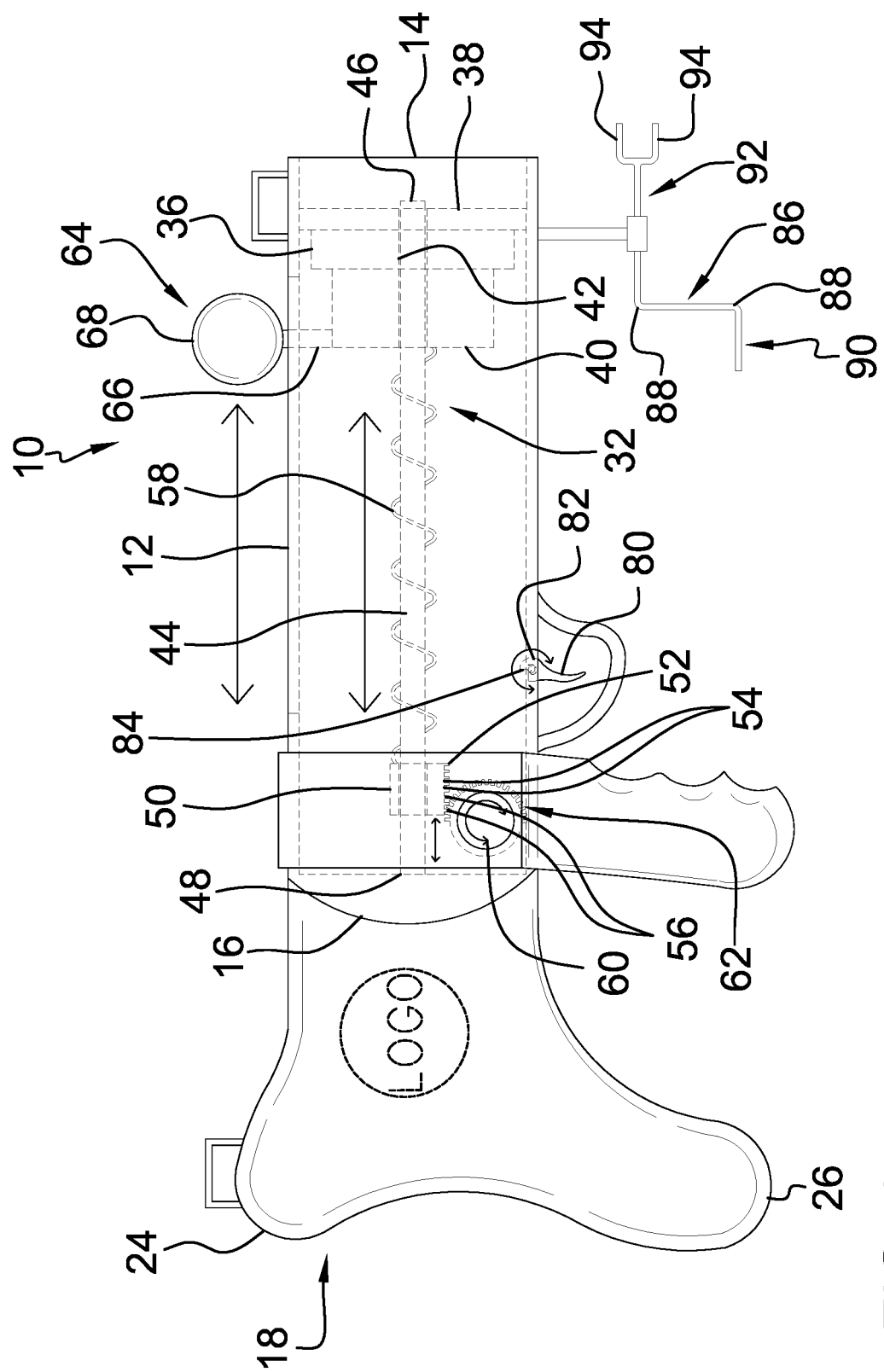
FIG. 1 is a right side phantom view of a cargo strap gun assembly according to an embodiment of the disclosure.
Figure 2:
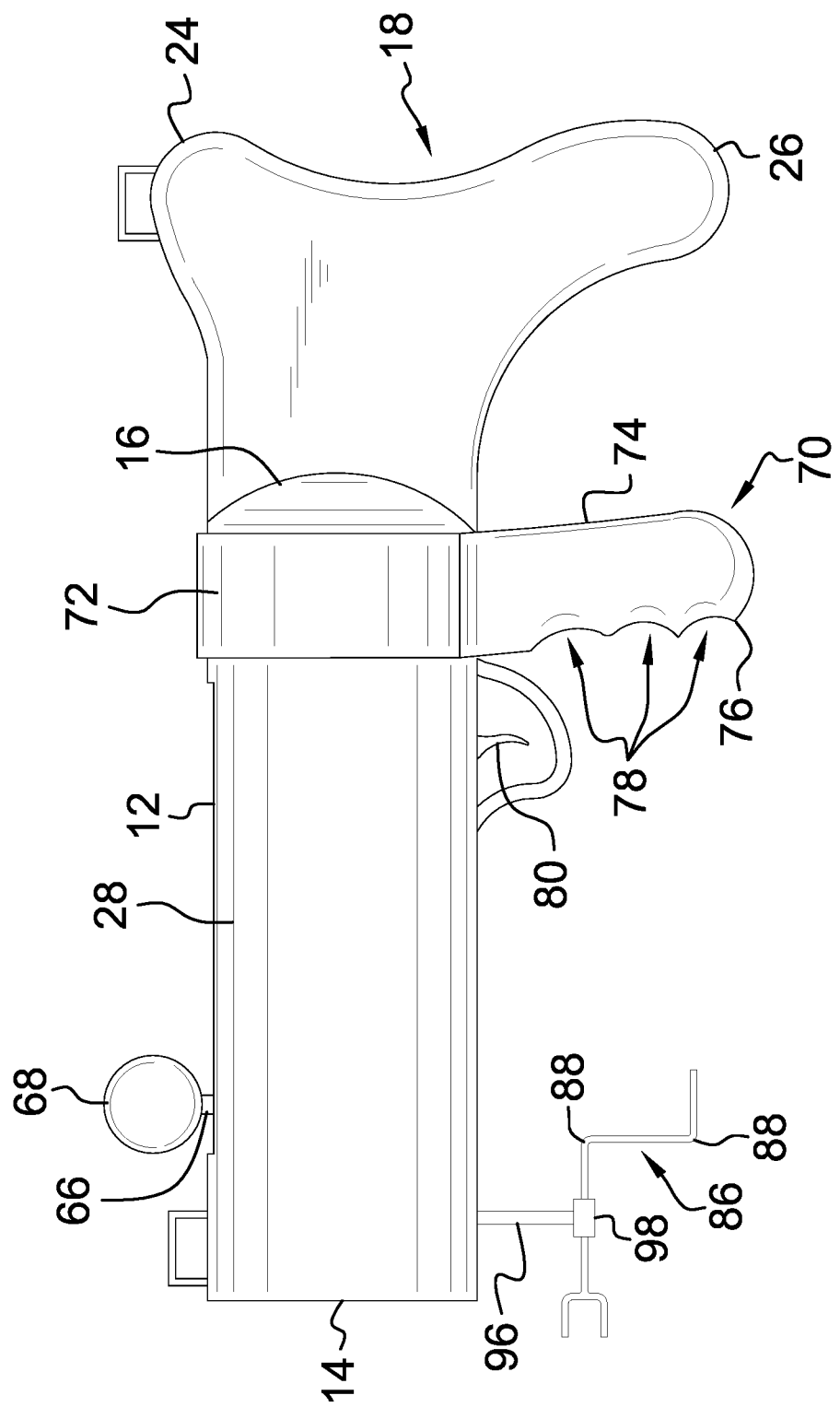
FIG. 2 is a left side view of an embodiment of the disclosure.
Figure 5:
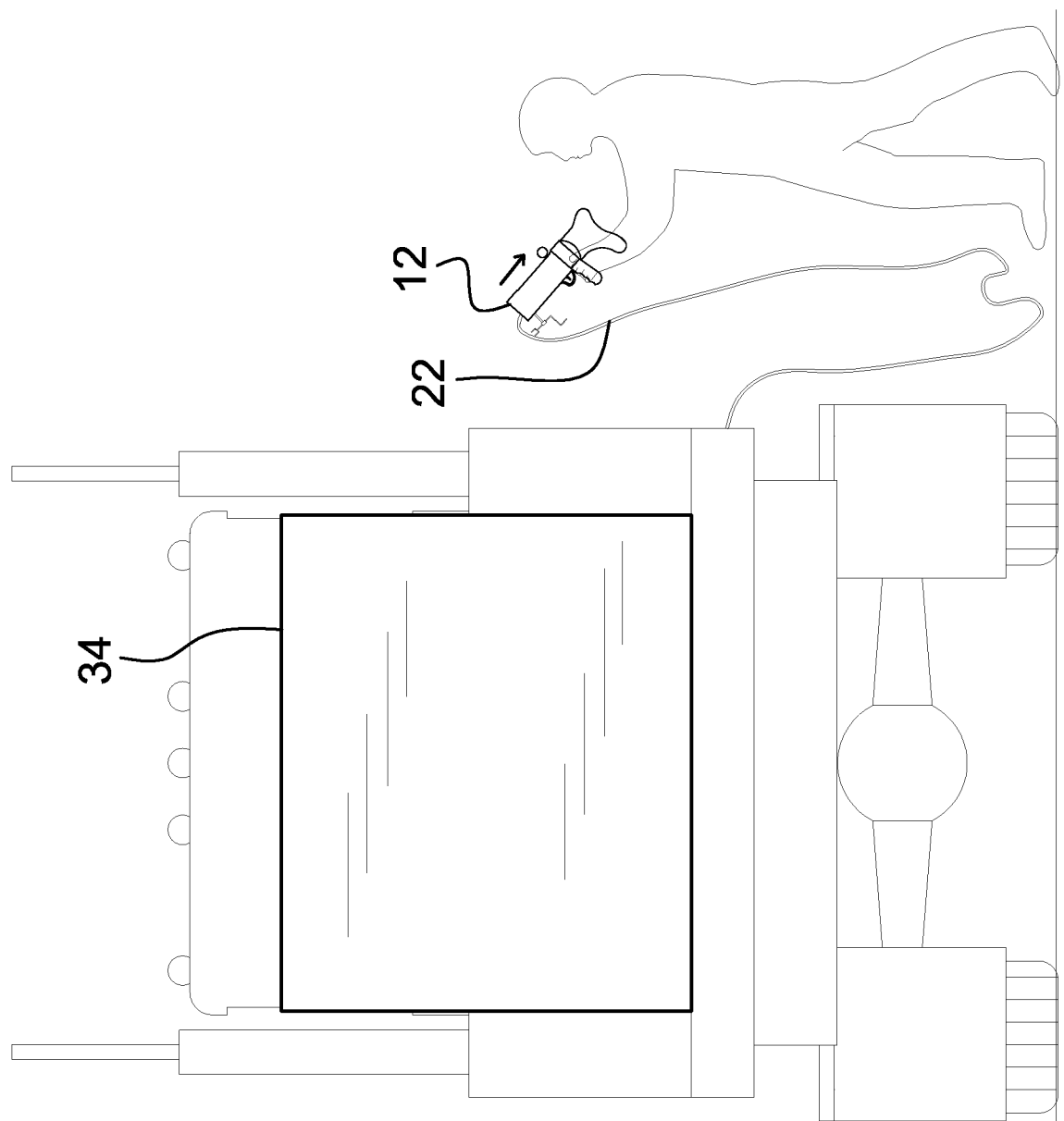
FIG. 5 is a perspective in-use view of an embodiment of the disclosure showing a cargo strap being loaded into a cylinder.
Figure 6:
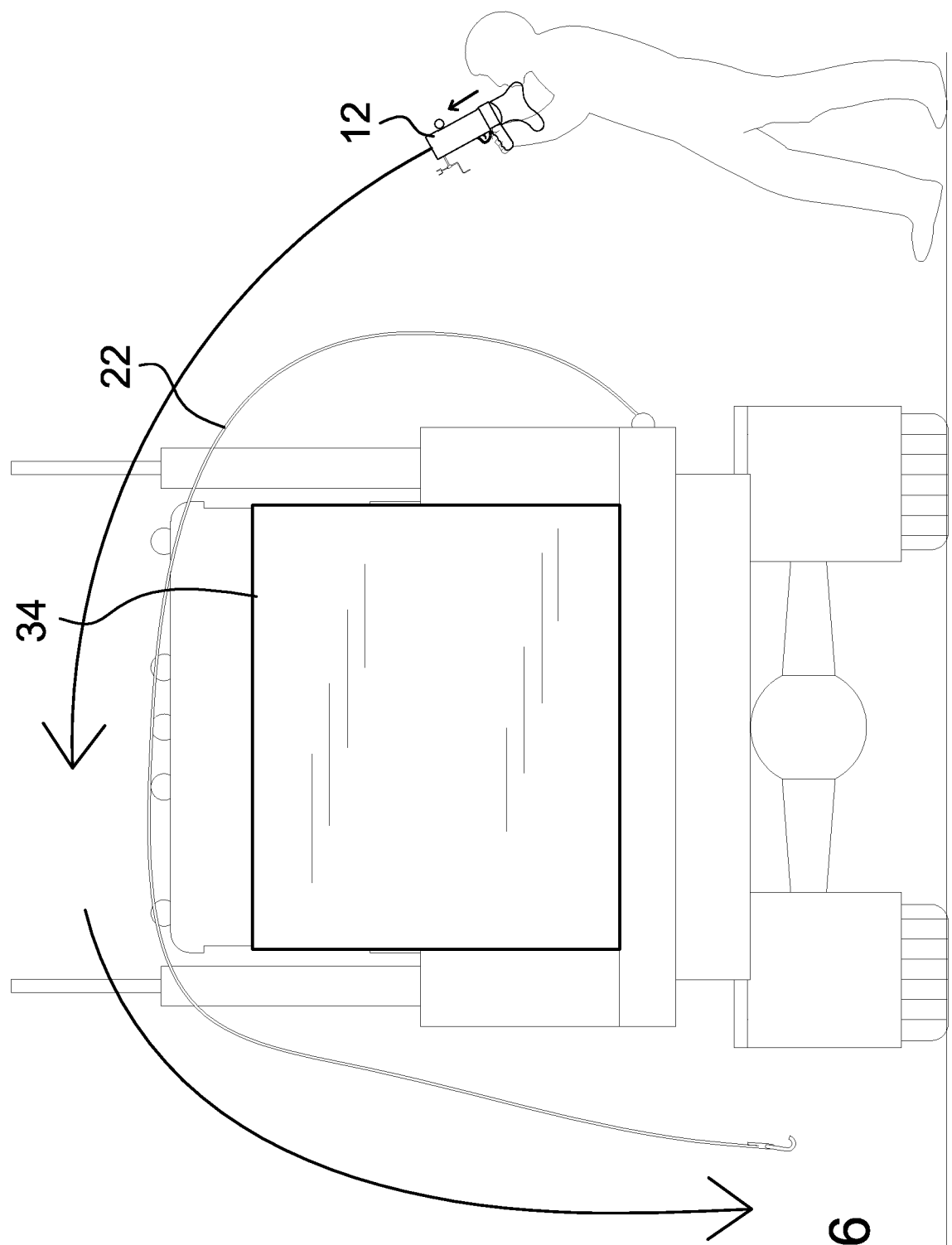
FIG. 6 is a perspective in-use view of an embodiment of the disclosure showing a cargo strap being launched over a load.

With reference now to the drawings, and in particular to FIGS. 1 through 6 thereof, a new gun device embodying the principles and concepts of an embodiment of the disclosure and generally designated by the reference numeral 10 will be described.

As best illustrated in FIGS. 1 through 6, the cargo strap gun assembly 10 generally comprises a cylinder 12 that has an open end 14 and a closed end 16. A butt stock 18 is integrated into the closed end 16 and the butt stock 18 can be positioned against a user's shoulder. The cylinder 12 is substantially hollow and the open end 14 is open into an interior of the cylinder 12 to facilitate a cargo strap 22 to be inserted in the open end 14. The butt stock 18 comprises a first lobe 24 and a second lobe 26, and the second lobe 26 extends downwardly from the cylinder 12. The butt stock 18 is concavely arcuate between the first lobe 24 and the second lobe 26 to accommodate curvature of the user's shoulder 20. The cylinder 12 has an outer wall 28, the outer wall 28 has a slot 30 extending into an interior of the cylinder 12 and the slot 30 extends substantially between the open end 14 and the closed end 16.

A plunger 32 is slidably positioned in the cylinder 12 and the plunger 32 is compressible into a loaded position having the plunger 32 being drawn rearwardly in the cylinder 12. In this way the plunger 32 can facilitate the cargo strap 22 to be loaded into the cylinder 12. The plunger 32 is biased into a fired position having the plunger 32 rapidly moving forwardly in the cylinder 12. In this way the plunger 32 can launch the cargo strap 22 outwardly from the cylinder 12 thereby facilitating the cargo strap 22 to be launched over a load 34. Thus, the user does not have to manually position the cargo strap 22 to extend over the load 34. The load 34 may be cargo that is positioned on a flatbed truck and the cargo strap 22 may be a cargo strap of any conventional design that is employed to secure the load 34 to the flatbed truck.

The plunger 32 comprises a disk 36 that has a front end 38 and a back end 40, and the disk 36 is positioned in the cylinder 12 such that each of the front end 38 and the back end 40 lie on a plane that is oriented perpendicular to an axis extending through the open end 14 and the closed end 16 of the cylinder 12. The disk 36 is positioned adjacent to the open end 14 when the plunger 32 is in the fired position and the disk 36 is distally positioned with respect to the open end 14 when the plunger 32 is in the loaded position. The disk 36 has a hole 42 extending through the front end 38 and the back end 40, and the hole 42 is aligned with a center point of the disk 36.

The plunger 32 includes a rod 44 that has a first end 46 and a second end 48, and the rod 44 is positioned within the cylinder 12. The first end 46 is coupled to the closed end 16 of the cylinder 12 and the rod 44 extends through the hole 42 in the disk 36 having the first end 46 of the rod 44 being positioned adjacent to the open end 14 of the cylinder 12. The plunger 32 includes a stop 50 that is positioned around the rod 44 and the stop 50 is positioned adjacent to the second end 48 of the rod 44. The stop 50 has a bottom side 52 and the bottom side 52 has a plurality of depressions 54 each extending upwardly therein to define a plurality of teeth 56 on the bottom side of the stop 50. The teeth 56 are distributed along an axis extending between the first end 46 and the second end 48 of the rod 44.

The plunger 32 includes a biasing member 58 that is coiled around the rod 44 and the biasing member 58 extends between the stop 50 and the back end 40 of the disk 36. The biasing member 58 is compressed between the disk 36 and the stop 50 when the plunger 32 is in the loaded position. Moreover, the biasing member 58 biases the disk 36 toward the open end 14. The biasing member 58 may comprise a spring 72 or other type of compressible biasing member 58.

The plunger 32 includes a knob 60 that is rotatably coupled to the cylinder 12 such that the knob 60 can be manipulated by a user. A gear 62 is integrated into the knob 60 and the knob 60 extends through an outer wall 28 of the cylinder 12 such that the gear 62 is positioned inside the cylinder 12. Moreover, the gear 62 engages the teeth 56 on the bottom side of the stop 50, and the knob 60 is rotatable in an increasing direction or a decreasing direction. The stop 50 is urged toward the first end 46 of the rod 44 when the knob 60 is rotated in the increasing direction thereby decreasing a distance between the stop 50 and the disk 36. In this way the energy stored in the biasing member 58 is increased when the biasing member 58 is compressed. The stop 50 is urged toward the second end 48 of the rod 44 when the knob 60 is rotated in the decreasing direction thereby increasing the distance between the stop 50 and the disk 36. In this way the energy stored in the biasing member 58 is decreased when the biasing member 58 is compressed.

A cocking mechanism 64 is slidably integrated into the cylinder 12 and the cocking mechanism 64 can be manipulated by a user. The cocking mechanism 64 is in mechanical communication with the plunger 32 and the cocking mechanism 64 urges the plunger 32 into the loaded position when the cocking mechanism 64 is slid rearwardly along the cylinder 12. The cocking mechanism 64 includes a stem 66 and a ball 68. The stem 66 extends through the slot 30 in the outer wall 28 of the cylinder 12 and the stem 66 engages the disk 36. The ball 68 is coupled to the stem 66 having the ball 68 being spaced from the outer wall 28 of the cylinder 12 such that the ball 68 can be gripped by the user.

A grip 70 is coupled to the cylinder 12 such that the grip 70 can be gripped by the user. The grip 70 includes a ring 72 and a member 74 extending downwardly from the ring 72. The ring 72 is positioned around the outer wall 28 of the cylinder 12 at a point located adjacent to the closed end 16 of the cylinder 12. The member 74 extends downwardly from the ring 72 and the member 74 has a front side 76 that is directed toward the open end 14 of the cylinder 12. The front side 76 has a plurality of depressions 78 extending therein to accommodate a respective one of the user's fingers.

A trigger 80 is movably integrated into the cylinder 12 and the trigger 80 can be manipulated by the user. The trigger 80 engages the plunger 32 when the plunger 32 is urged into the loaded position for retaining the plunger 32 in the loaded position. The trigger 80 disengages the plunger 32 when the trigger 80 is actuated thereby facilitating the plunger 32 to be biased into the fired position. The trigger 80 extends through the outer wall 28 of cylinder 12 having an upper end 82 of the trigger 80 being positioned inside the cylinder 12. The upper end 82 has a catch 84 integrated therein and the catch 84 releasably engages the disk 36. Additionally, the catch 84 disengages the disk 36 when the trigger 80 is actuated.

A crank 86 is rotatably coupled to the cylinder 12 the cargo strap 22 can be engaged to the crank 86. The crank 86 is rotatable in a first direction to roll the cargo strap 22 for storage. The crank 86 has a plurality of bends 88 thereon to define a handle portion 90 of the crank 86 and a cranking portion 92 of the crank 86. The cranking portion 92 has a pair of spaced members 94 and the cargo strap 22 can be positioned between the spaced members 94. Moreover, the spaced members 94 orbit about an axis extending through the cranking portion 92 of the crank 86 when the handle portion 90 is rotated thereby wrapping the cargo strap 22 around the spaced members 94. A mount 96 is coupled to and extends downwardly from the outer wall 28 of the cylinder 12 and the mount 96 includes a sleeve 98 through which the cranking portion 92 of the crank 86 extends.

In use, the cocking mechanism 64 is manipulated to position the plunger 32 in the loaded position and the cargo strap 22 is loaded into the cylinder 12. The open end 14 of the cylinder 12 is aimed above the load 34 and the trigger 80 is actuated to release the plunger 32. Thus, the plunger 32 is rapidly biased into the fired position to launch the cargo strap 22 over the load 34. In this way the cargo strap 22 can automatically be extended over the load 34 thereby facilitating the cargo strap 22 to be tightened over the load 34. Moreover, the cargo strap 22 can be extended over the load 34 without requiring the user to climb over the load 34 to manually extend the cargo strap 22 over the load 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cargo strap gun assembly for launching a cargo strap across a load, said assembly comprising:
   a cylinder having an open end and a closed end, said closed end having a butt stock being integrated thereon wherein said butt stock is configured to be positioned against a user's shoulder, said cylinder being substantially hollow, said open end being open into an interior of said cylinder wherein said open end is configured to have a cargo strap inserted therein;
   a plunger being slidably positioned in said cylinder, said plunger being compressible into a loaded position having said plunger being drawn rearwardly in said cylinder wherein said plunger is configured to facilitate the cargo strap to be loaded into said cylinder, said plunger being biased into a fired position having said plunger rapidly moving forwardly in said cylinder wherein said plunger is configured to launch the cargo strap outwardly from said cylinder thereby facilitating the cargo strap to be launched over a load, said plunger comprising
      a disk having a front end and a back end, said disk being positioned in said cylinder such that each of said front end and said back end lies on a plane being oriented perpendicular to an axis extending through said open end and said closed end of said cylinder, said disk being positioned adjacent to said open end when said plunger is in said fired position, said disk being distally positioned with respect to said open end when said plunger is in said loaded position, said disk having a hole extending through said front end and said back end, said hole being aligned with a center point of said disk,
      a rod having a first end and a second end, said rod being positioned within said cylinder, said first end being coupled to said closed end of said cylinder, said rod extending through said hole in said disk having said first end of said rod being positioned adjacent to said open end of said cylinder,
      a stop being positioned around said rod, said stop being positioned adjacent to said second end of said rod, said stop having a bottom side, said bottom side having a plurality of depressions each extending upwardly therein to define a plurality of teeth on said bottom side of said stop being distributed along an axis extending between said first end and said second end of said rod,
      a biasing member being coiled around said rod, said biasing member extending between said stop and said back end of said disk, said biasing member being compressed between said disk and said stop when said plunger is in said loaded position, said biasing member biasing said disk toward said open end,
      a knob being rotatably coupled to said cylinder wherein said knob is configured to be manipulated by a user, said knob having a gear being integrated thereon, said knob extending through an outer wall of said cylinder having said gear being positioned inside said cylinder, said gear engaging said teeth on said bottom side of said stop, said knob being rotatable in an increasing direction or a decreasing direction, said stop is urged toward said first end of said rod when said knob is rotated in said increasing direction thereby decreasing a distance between said stop and said disk for increasing energy stored in said biasing member when said biasing member is compressed, said stop is urged toward said second end of said rod when said knob is rotated in said decreasing direction thereby increasing the distance between said stop and said disk for decreasing energy stored in said biasing member when said biasing member is compressed;
   a cocking mechanism being slidably integrated into said cylinder wherein said cocking mechanism is configured to be manipulated by a user, said cocking mechanism being in mechanical communication with said plunger, said cocking mechanism urging said plunger into said loaded position when said cocking mechanism is slid rearwardly along said cylinder;
   a grip being coupled to said cylinder wherein said grip is configured to be gripped by the user;
   a trigger being movably integrated into said cylinder wherein said trigger is configured to be manipulated by the user, said trigger engaging said plunger when said plunger is urged into said loaded position for retaining said plunger in said loaded position, said trigger disengaging said plunger when said trigger is actuated thereby facilitating said plunger to be biased into said fired position; and
   a crank being rotatably coupled to said cylinder wherein said crank is configured to have the cargo strap engaged thereto, said crank being rotatable in a first direction wherein said crank is configured to roll the cargo strap for storage.

2. The assembly according to claim 1, wherein:
   said cylinder has an outer wall, said outer wall having a slot extending into an interior of said cylinder, said slot extending substantially between said open end and said closed end; and
   said cocking mechanism includes a stem and a ball, said stem extending through said slot in said outer wall of said cylinder, said stem engaging said disk, said ball being coupled to said stem having said ball being spaced from said outer wall of said cylinder wherein said ball is configured to be gripped by the user.

3. The assembly according to claim 1, wherein said grip includes a ring and a member extending downwardly from said ring, said ring being positioned around an outer wall of said cylinder at a point located adjacent to said closed end of said cylinder, said member extending downwardly from said ring, said member having a front side being directed toward said open end of said cylinder, said front side having a plurality of depressions extending therein wherein said depressions are configured to accommodate a respective one of the user's fingers.

4. The assembly according to claim 1, wherein said trigger extends through an outer wall of cylinder having an upper end of said trigger being positioned inside said cylinder, said upper end having a catch being integrated therein, said catch releasably engaging said disk, said catch disengaging said disk when said trigger is actuated.

5. The assembly according to claim 1, wherein said crank has a plurality of bends thereon to define a handle portion of said crank and a cranking portion of said crank, said cranking portion having a pair of spaced members wherein said spaced members are configured to have the cargo strap positioned therebetween, said spaced members orbiting about an axis extending through said cranking portion of said crank when said handle portion is rotated wherein said space members are configured to wrap the cargo strap around said spaced members.

6. A cargo strap gun assembly for launching a cargo strap across a load, said assembly comprising:
- a cylinder having an open end and a closed end, said closed end having a butt stock being integrated thereon wherein said butt stock is configured to be positioned against a user's shoulder, said cylinder being substantially hollow, said open end being open into an interior of said cylinder wherein said open end is configured to have a cargo strap inserted therein, said butt stock comprising a first lobe and a second lobe, said second lobe extending downwardly from said cylinder, said cylinder having an outer wall, said outer wall having a slot extending into an interior of said cylinder, said slot extending substantially between said open end and said closed end;
- a plunger being slidably positioned in said cylinder, said plunger being compressible into a loaded position having said plunger being drawn rearwardly in said cylinder wherein said plunger is configured to facilitate the cargo strap to be loaded into said cylinder, said plunger being biased into a fired position having said plunger rapidly moving forwardly in said cylinder wherein said plunger is configured to launch the cargo strap outwardly from said cylinder thereby facilitating the cargo strap to be launched over a load, said plunger comprising:
  - a disk having a front end and a back end, said disk being positioned in said cylinder such that each of said front end and said back end lie on a plane being oriented perpendicular to an axis extending through said open end and said closed end of said cylinder, said disk being positioned adjacent to said open end when said plunger is in said fired position, said disk being distally positioned with respect to said open end when said plunger is in said loaded position, said disk having a hole extending through said front end and said back end, said hole being aligned with a center point of said disk;
  - a rod having a first end and a second end, said rod being positioned within said cylinder, said first end being coupled to said closed end of said cylinder, said rod extending through said hole in said disk having said first end of said rod being positioned adjacent to said open end of said cylinder;
  - a stop being positioned around said rod, said stop being positioned adjacent to said second end of said rod, said stop having a bottom side, said bottom side having a plurality of depressions each extending upwardly therein to define a plurality of teeth on said bottom side of said stop being distributed along an axis extending between said first end and said second end of said rod;
  - a biasing member being coiled around said rod, said biasing member extending between said stop and said back end of said disk, said biasing member being compressed between said disk and said stop when said plunger is in said loaded position, said biasing member biasing said disk toward said open end; and
  - a knob being rotatably coupled to said cylinder wherein said knob is configured to be manipulated by a user, said knob having a gear being integrated thereon, said knob extending through an outer wall of said cylinder having said gear being positioned inside said cylinder, said gear engaging said teeth on said bottom side of said stop, said knob being rotatable in an increasing direction or a decreasing direction, said stop being urged toward said first end of said rod when said knob is rotated in said increasing direction thereby decreasing a distance between said stop and said disk for increasing energy stored in said biasing member when said biasing member is compressed, said stop being urged toward said second end of said rod when said knob is rotated in said decreasing direction thereby increasing the distance between said stop and said disk for decreasing energy stored in said biasing member when said biasing member is compressed;
- a cocking mechanism being slidably integrated into said cylinder wherein said cocking mechanism is configured to be manipulated by a user, said cocking mechanism being in mechanical communication with said plunger, said cocking mechanism urging said plunger into said loaded position when said cocking mechanism is slid rearwardly along said cylinder, said cocking mechanism including a stem and a ball, said stem extending through said slot in said outer wall of said cylinder, said stem engaging said disk, said ball being coupled to said stem having said ball being spaced from said outer wall of said cylinder wherein said ball is configured to be gripped by the user;
- a grip being coupled to said cylinder wherein said grip is configured to be gripped by the user, said grip including a ring and a member extending downwardly from said ring, said ring being positioned around said outer wall of said cylinder at a point located adjacent to said closed end of said cylinder, said member extending downwardly from said ring, said member having a front side being directed toward said open end of said cylinder, said front side having a plurality of depressions extending therein wherein said depressions are configured to accommodate a respective one of the user's fingers;
- a trigger being movably integrated into said cylinder wherein said trigger is configured to be manipulated by the user, said trigger engaging said plunger when said plunger is urged into said loaded position for retaining said plunger in said loaded position, said trigger disengaging said plunger when said trigger is actuated thereby facilitating said plunger to be biased into said fired position, said trigger extending through said outer wall of cylinder having an upper end of said trigger being positioned inside said cylinder, said upper end having a catch being integrated therein, said catch releasably engaging said disk, said catch disengaging said disk when said trigger is actuated; and
- a crank being rotatably coupled to said cylinder wherein said crank is configured to have the cargo strap engaged thereto, said crank being rotatable in a first direction wherein said crank is configured to roll the cargo strap for storage, said crank having a plurality of bends thereon to define a handle portion of said crank and a cranking portion of said crank, said cranking portion having a pair of spaced members wherein said spaced members are configured to have the cargo strap positioned therebetween, said spaced members orbiting about an axis extending through said cranking portion of said crank when said handle portion is rotated wherein said space members are configured to wrap the cargo strap around said spaced members.

* * * * *